United States Patent
Ma et al.

(10) Patent No.: US 11,189,014 B2
(45) Date of Patent: Nov. 30, 2021

(54) METHOD AND DEVICE FOR PROCESSING IMAGE, AND STORAGE MEDIUM

(71) Applicant: BEIJING XIAOMI MOBILE SOFTWARE CO., LTD., Beijing (CN)

(72) Inventors: Hailong Ma, Beijing (CN); Xiangxiang Chu, Beijing (CN); Qike Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 23 days.

(21) Appl. No.: 16/687,645

(22) Filed: Nov. 18, 2019

(65) Prior Publication Data

US 2021/0027426 A1     Jan. 28, 2021

(30) Foreign Application Priority Data

Jul. 26, 2019   (CN) .......................... 201910684108.X (51) Int. Cl.
    *G06T 3/40*     (2006.01)
    *G06K 9/62*     (2006.01)
    *G06N 3/08*     (2006.01)
    *G06T 5/00*     (2006.01)

(52) U.S. Cl.
    CPC .......... *G06T 3/4069* (2013.01); *G06K 9/6256* (2013.01); *G06N 3/08* (2013.01); *G06T 5/002* (2013.01); *G06T 5/003* (2013.01)

(58) Field of Classification Search
    None
    See application file for complete search history.

(56) References Cited

U.S. PATENT DOCUMENTS

2018/0075581 A1   3/2018  Shi et al.
2020/0402205 A1*  12/2020  Su ........................ G06T 3/4053

FOREIGN PATENT DOCUMENTS

| CN | 103020908 A | 4/2013 |
| CN | 108550115 A | 9/2018 |
| CN | 109064428 A | 12/2018 |
| CN | 109360154 A | 2/2019 |
| WO | 2016132147 A1 | 8/2016 |

OTHER PUBLICATIONS

Zhang Kai et al: "Learning a Single Convolutional Super-Resolution Network for Multiple Degradations", IEEE/CVF Conference on Computer Vision and Pattern Recognition , IEEE, Jun. 18, 2018 (Jun. 18, 2018), pp. 3262-3271, XP033476295, [retrieved on Dec. 14, 2018] p. 3264, left-hand column, paragraph 3—p. 3265 right-hand column, paragraph 2.

(Continued)

*Primary Examiner* — Leon Flores
(74) *Attorney, Agent, or Firm* — Syncoda LLC; Feng Ma (57) ABSTRACT

A method for processing an image includes: an image to be processed with a first resolution is acquired; and the image to be processed is processed by a target neural network model to obtain a target image, the target image being a denoised image with a second resolution, the second resolution being higher than the first resolution, and the target neural network model including a first preset number of convolutional layers and a second preset number of sub-pixel up-sampling portions.

14 Claims, 7 Drawing Sheets

An image to be processed with a first resolution is acquired — 101

The image to be processed is processed by a target neural network model to obtain a target image, the target image being a denoised image with a second resolution — 102

(56) References Cited

OTHER PUBLICATIONS

Wenzhe Shi et al: "Real-Time Single Image and Video Super-Resolution Using an Efficient Sub-Pixel Convolutional Neural Network", 2016 IEEE Conference on Computer Vision and Pattern Recognition (CVPR), Jun. 27, 2016 (Jun. 27, 2016), pp. 1874-1883, XP033021365, p. 1876, left-hand column, paragraph 3—p. 1877, right-hand column, paragraph 1; figure 1.

Chao Dong et al.: "Image Super-Resolution Using Deep Convolutional Networks", IEEE Transactions on Pattern Analysis and Machine Intelligence, vol. 38, No. 2, Feb. 1, 2016 (Feb. 1, 2016), pp. 295-307, XP055539754, USA p. 299, left-hand column, last paragraph—right-hand column, paragraph 2.

Jinghui Chu et al.: "A Novel Multiconnected Convolutional Network for Super-Resolution", IEEE Signal Processing Letters, vol. 25, No. 7, Jul. 1, 2018 (Jul. 1, 2018), pp. 946-950, XP55663222, p. 948, left-hand column, paragraph 2.

Bae Woong et al: "Beyond Deep Residual Learning for Image Restoration: Persistent Homology-Guided Manifold Simplification", IEEE Conference on Computer Vision and Pattern Recognition Workshops, IEEE, Jul. 21, 2017 (Jul. 21, 2017), pp. 1141-1149, XP033145894, [retrieved on Aug. 22, 2017] p. 148, left-hand column, paragraph 2—p. 149, left-hand column, paragraph 2.

Agustsson Eirikur et al.: "NTIRE 2017 Challenge on Single Image Super-Resolution: Dataset and Study", IEEE Conference On Computer Vision and Pattern Recognition Workshops, IEEE, Jul. 21, 2017 (Jul. 21, 2017), pp. 1121-1131, XP033145892, [retrieved on Aug. 22, 2017] p. 115, left-hand column, paragraph 3—p. 121, left-hand column, paragraph 2.

Supplementary European Search Report in the European application No. 19212587.0, dated Feb. 10, 2020.

Photo-Realistic Single Image Super-Resolution Using a Generative Adversarial Network, CVPR2017.

Enhanced Deep Residual Networks for Single Image Super-Resolution, CVPRW2017.

Tong tong, et al. Image Super-Resolution Using Dense Skip Connections.

First Office Action of the Chinese application No. 201910684108.X, dated Jun. 3, 2021.

A. Vedaldi et al: "MatConvNet-Convulutional Neural Networks for MATLAB", Multimedia, May 5, 2016, pp. 1-59, XP055651748.

Makarov I, et al: "Depth map Interpolation Using Perceptual Loss", IEEE International Symposium on Mixed and Augmented Reality, IEEE, Oct. 9, 2017, pp. 93-94.

Anam Sarawat et al: "Face Recognition Using Genetic Algorithm and Back Propagation Neural Network". Int. MultiConference of Engineers and Computer Scientists, Mar. 20, 2009, pp. 811-814. XP55829106.

Second Office Action of the European application No. 19212587.0, dated Sep. 20, 2021.

\* cited by examiner

METHOD AND DEVICE FOR PROCESSING IMAGE, AND STORAGE MEDIUM

CROSS-REFERENCE TO RELATED APPLICATION

This application claims priority to Chinese patent application No. 201910684108.X filed on Jul. 26, 2019, the disclosure of which is hereby incorporated by reference in its entirety.

BACKGROUND

Images are important carriers for information transmitted through the Internet. Due to the limits of a bandwidth etc., an image transmitted over the Internet usually is compressed from an original image to reduce pressure on bandwidth and transmit information faster. However, noise associated with image compression can cause the problems of reduction in quality and resolution of the image, and affect user experience.

SUMMARY

The present disclosure generally relates to the field of image processing, and more specifically, to a method and device for processing an image, and a storage medium.

According to a first aspect of embodiments of the present disclosure, there is provided a method for processing an image, which may be applied to a mobile terminal and include that:

an image to be processed with a first resolution is acquired; and the image to be processed is processed by a target neural network model to obtain a target image, the target image being a denoised image with a second resolution, the second resolution being higher than the first resolution, and the target neural network model including a first preset number of convolutional layers and a second preset number of sub-pixel up-sampling portions.

According to a second aspect of the embodiments of the present disclosure, there is provided a device for processing an image, which may include:

a processor; and a memory configured to store an instruction executable for the processor, wherein the processor may be configured to:

acquire an image to be processed with a first resolution; and process, by a target neural network model, the image to be processed to obtain a target image, the target image being a denoised image with a second resolution, the second resolution being higher than the first resolution, and the target neural network model including a first preset number of convolutional layers and a second preset number of sub-pixel up-sampling portions.

According to a third aspect of the embodiments of the present disclosure, there is provided a non-transitory computer-readable storage medium having stored a computer program instruction that, when being executed by a processor, implements the operations of the method for processing the image which is provided in the first aspect of the present disclosure.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

A typical network model adopted for image compressing can have complex structures and low computing efficiency, and thus can hardly run in a mobile terminal. In addition, it may not have denoising effect for image processing.

A super-resolution technology is used to process a low-resolution image to further improve a resolution and sharpness of the image and thus to achieve a better sensory effect.

The super-resolution technology is a process of increasing the resolution of the original image by hardware or software and is a process of obtaining a high-resolution image by use of a series of low-resolution images. Conventional super-resolution technologies mainly include a frequency-domain method, a projection method, a filter method, a restricted least-square algorithm and the like. Most of the conventional super-resolution technologies are based on manually extracted characteristics which require massive artificial designs and have poor effects. Therefore, with the rising of deep learning, convolutional neural networks have achieved effects remarkably better than those achieved by conventional methods in many fields of computer vision. Thus, adopting a deep learning technology to solve super-resolution problems has become an advanced research content.

Super Resolution Convolutional Neural Network (SRCNN) is a relatively old algorithm for solving super-resolution problems by use of a convolutional neural network. According to the SRCNN, a low-resolution image is magnified by up-sampling to obtain an image with a specified size, and then the image is processed in a high-dimensional space by a three-layer convolutional network to obtain a super-resolution picture. The test effect on a classical dataset is approximate to or better than that achieved by the conventional methods. However, processing efficiency for image by the SRCNN in the high-dimensional space is low, and thus adoption of a sub-pixel up-sampling technology for it is proposed. That is, most of operations are controlled in a low-dimensional space, and then low-dimensional characteristics are combined into high-dimensional characteristics by sub-pixel sampling for output. Herein, a typical network model is a Super Resolution Generative Adversarial Network (SRGAN). A Generative Adversarial Network (GAN) is adopted to solve super-resolution problems.

A GAN technology is introduced based on pre-training by a residual convolutional neural network to further ensure a relatively high signal-to-noise ratio and simultaneously to achieve a super-resolution effect more consistent with human vision. During network training, a mean square error is adopted as a loss function, and the sense of reality of a restored image is improved by use of perceptual loss and adversarial loss. Therefore, although a high peak signal-to-noise ratio may be obtained, the restored image may usually have no high-frequency details and may not provide a good visual experience.

For the perceptual loss, characteristics extracted by a convolutional neural network are utilized, and the characteristic of a generative image passing through the convolutional neural network is compared with the characteristic of a target image passing through the convolutional neural network to obtain a difference to make semanteme and styles of the generative image and the target image more similar. In addition, in some improved network structures, a generative network part of the SRGAN is optimized by the mean square error to obtain a result having a high peak signal-to-noise ratio.

Perceptual loss in a high-layer characteristic of a trained VGG model is computed to optimize the SRGAN, and thus a result which has a relatively low peak signal-to-noise ratio and has a realistic visual effect may be obtained in combination with a discrimination network of the SRGAN.

A network structure in another algorithm by introducing the sub-pixel up-sampling technology into the convolutional neural network to solve the super-resolution problems is an Enhanced Deep Residual Network for Single Image Super-Resolution (EDSR). Compared with the generative network part of the SRGAN, the structure of the EDSR eliminates a Batch Normalization (BN) operation. Since a BN layer consumes a memory size the same as that of a convolutional layer before the BN layer, after the operation is eliminated, more network layers may be stacked by the EDSR or each layer may extract more characteristics under the same computing resources, and thus better performance may be achieved.

In addition, a network model of the EDSR is optimized by use of a loss function of an L1 norm pattern, and during training, a low-multiple up-sampling model is trained at first and then a high-multiple up-sampling model is initialized by use of parameters obtained by training the low-multiple up-sampling model, so that training time for the high-multiple up-sampling model may be reduced, a better training result may be obtained, and a high signal-to-noise ratio is achieved.

However, these methods have the shortcomings of relatively low computing efficiency and incapability of running in mobile devices. By these methods, only the super-resolution problems are solved, and no denoising effect is achieved.

Therefore, the present disclosure is intended to solve the problem of incapability in super-resolution processing of an image on a device with limited computing capacity in the conventional art, and further discloses a deep learning technology-based denoising super-resolution method applied to a mobile terminal. Both denoising and super resolution can be achieved by use of a simplified network structure based on a deep learning technology.

Figure 1:
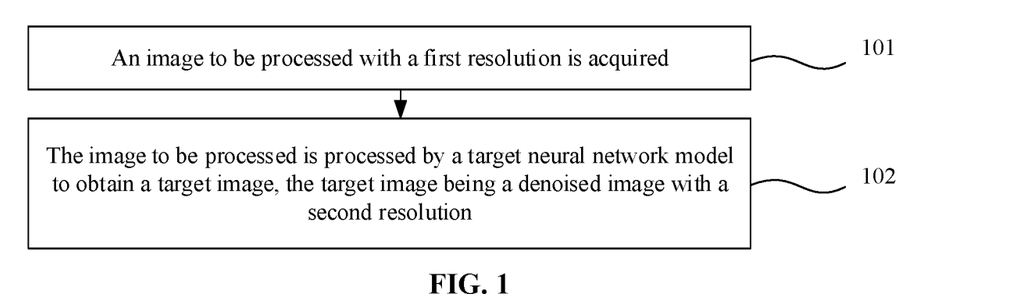
FIG. 1 is a flowchart showing a method for processing an image, according to some embodiments of the present disclosure.

FIG. 1 is a flowchart showing a method for processing an image, according to some embodiments of the present disclosure. As shown in FIG. 1, the method is applied to a mobile terminal and includes the following operations.

In operation 101, an image to be processed with a first resolution is acquired.

In operation 102, the image to be processed is processed by a target neural network model to obtain a target image, the target image being a denoised image with a second resolution.

The target image is the denoised image with the second resolution, which is obtained by processing the image to be processed by the target neural network model, and the second resolution is higher than the first resolution. That is, the acquired image to be processed has a low-resolution, and is processed by a target neural network to obtain the denoised high-resolution image.

The target neural network model includes a first preset number of convolutional layers and a second preset number of sub-pixel up-sampling portions.

Exemplarily, the target neural network model for image processing of the present disclosure consists of the convolutional layers and the sub-pixel up-sampling portions, and is applied to processing of an image in any size. The convolutional layers of the target neural network model are positioned in an upper layer of the sub-pixel up-sampling portions. The first preset number may be set according to requirements for performance and effect of a practical application place, and the first preset number is optionally 5, 6 or 7. Generally, when a requirement on computing time is relatively high, the number of the convolutional layers may be properly decreased to improve image processing performance; and when a requirement on an image processing effect is relatively high, the number of the convolutional layers may be properly increased to improve a sensory effect of the image. When a step length of the convolutional layer is set to be 1, a purpose of an image processing to be required by the technical solution of the present disclosure may be achieved. Then, the image is sampled by the sub-pixel up-sampling portions by taking a sub-pixel as a basic unit. A sub-pixel is a color component of a standard pixel. Different original image information is acquired in different sub-pixel sampling manners.

For example, sub-pixel down-sampling is performed based on a sampling factor 3, and a sampled image with a resolution M*N is obtained by an original image L with a resolution 3M*3N passing through a sub-pixel down-sampling portion. In addition, for keeping a size of the image obtained by the target neural network model unchanged, a corresponding number of sub-pixel up-sampling portions in corresponding sizes may be selected. The sub-pixel up-sampling portions are adopted instead of a fully connected layer adopted in a general neural network to implement restoration of the image to be processed with the original size.

Therefore, the target neural network model disclosed in the present disclosure adopts characteristic extractions and operations of a low-dimensional space to further reduce operations so that the target neural network model may be used for a mobile terminal with relatively low computing capacity, and meanwhile, denoising and super-resolution processing of the image is implemented.

Figure 2:
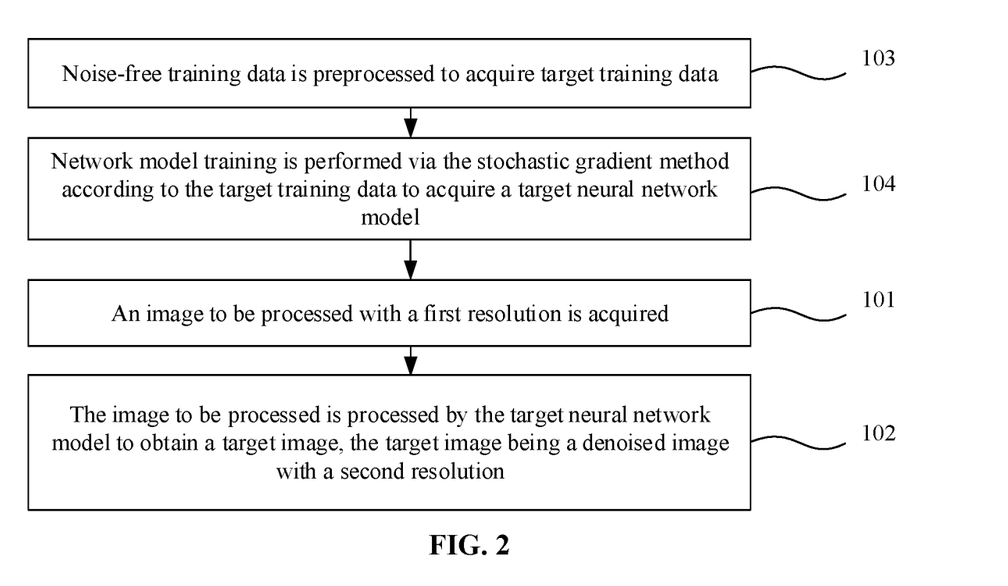
FIG. 2 is a flowchart showing another method for processing an image, according to some embodiments of the present disclosure.

FIG. 2 is a flowchart showing another method for processing an image, according to some embodiments of the present disclosure. As shown in FIG. 2, the method includes the following operations.

In operation 103, noise-free image data is preprocessed to acquire target training data.

Exemplarily, before processing an image by embodiment shown in FIG. 1, it is also necessary to determine the target neural network model, namely training the target neural network model. Since input of the target neural network model for image processing in the abovementioned embodiment is the first-resolution image that is an original low-resolution image, i.e., the image to be processed in operation 101, a noise of the image which is generated in transmission, storage, compression and decompression processes may be eliminated by processing the image to be processed by the target neural network model, and super-resolution processing may be performed to output the denoised image with the second resolution, namely operation 102 is executed. The first resolution is lower than the second resolution, so that the output image that is further acquired provides a relatively good sensory effect for a user, and a user experience is improved. Therefore, correspondingly, when the target neural network model is trained, it is necessary to preprocess the noise-free image data with the second resolution (i.e., a high resolution) to generate a combination of a noisy low-resolution image and a noise-free low-resolution image as the target training data for training the target neural network model to determine parameters of the target neural network model by gradient training.

In operation 104, an initial network model is trained by use of the target training data via a stochastic gradient method to acquire the target neural network model.

Exemplarily, the target training data with a preset batch size of each batch is used as input to train the initial network model by use of a preset loss function via the stochastic gradient method to acquire the target neural network model.

The loss function includes a mean square error, a total variation and perceptual loss, and the mean square error includes a red channel error, a green channel error and a blue channel error.

The stochastic gradient method may adopt stochastic gradient descent or gradient-like descent for processing, and is applied to machine learning and artificial intelligence to implement recursive approximation of a minimum deviation model to optimize and determine each parameter in the target neural network model. The loss function consists of a weighted sum of a mean square error, a total variation and perceptual loss, and a value of a weight corresponding to each part of the loss function may correspond to a practical application scenario. If a super-resolution effect is emphasized more for processing of the image, the weight of the mean square error may be increased; and if a denoising effect is emphasized more, the weights of the total variation and the perceptual loss may be increased. Correspondingly, the mean square error consists of a weighted sum of a red channel error, a green channel error and a blue channel error, and a weighted value corresponding to each part of the mean square error may be regulatable. Since a human eye is relatively sensitive to green, a weight of the green channel error in the mean square error may be set to be relatively great.

Parameters of each layer in the initial network model is trained via the stochastic gradient method to acquire the optimized target neural network model to further implement denoising and super-resolution processing of the image to be processed.

Figure 3:
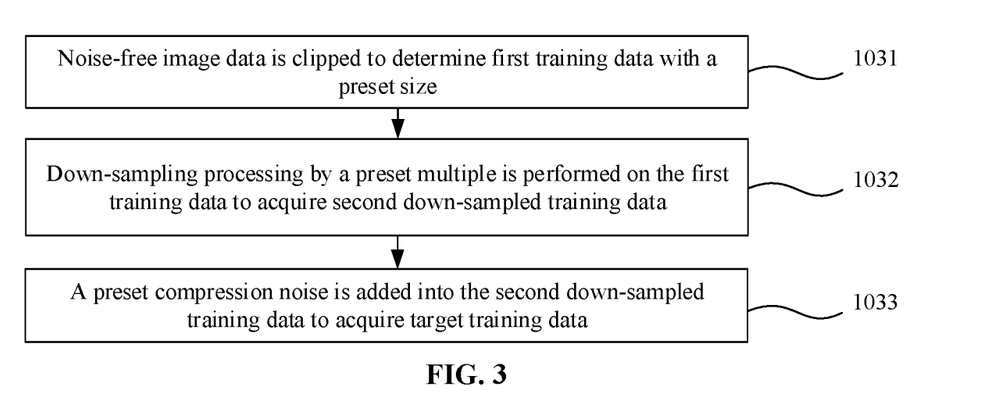
FIG. 3 is a flowchart showing yet another method for processing an image, according to some embodiments of the present disclosure.

FIG. 3 is a flowchart showing another method for processing an image, according to some embodiments of the present disclosure. As shown in FIG. 3, the operation in operation 103 that the noise-free image data is preprocessed to acquire the target training data includes the following operations.

In operation 1031, the noise-free image data is clipped to determine first training data with a preset size.

The noise-free image data with the preset image size is clipped, the preset image size being randomly preset.

In operation 1032, down-sampling processing by a preset multiple is performed on the first training data to acquire second down-sampled training data.

Exemplarily, down-sampling processing is performed on the first training data clipped in operation 1031, and the corresponding down-sampling multiple is usually less than or equal to 4 in the application scenario involved in the present disclosure. Therefore, when the down-sampling multiple is 2, a sub-pixel up-sampling portion with a magnification multiple 2 is correspondingly adopted; when the down-sampling multiple is 3, a sub-pixel up-sampling portion with a magnification multiple 3 is correspondingly adopted; and when the down-sampling multiple is 4, two sub-pixel up-sampling portions with the magnification multiple 2 are correspondingly adopted. Furthermore, the size of the image that is processed by the target neural network model is kept unchanged.

In operation 1033, a preset compression noise is added into the second down-sampled training data to acquire the target training data.

Exemplarily, since the second down-sampled training data is obtained by clipping in operation 1031 and down-sampling in operation 1032 for the high-resolution noise-free image data, and by adding the preset compression noise into the second down-sampled training data, herein the noise is artificially generated compression noise with different levels, proportion parameters may be finely regulated according to a specific application scenario and a requirement, and then the compression noise with different levels is randomly added into the second training data to generate the target training data, such that the parameters of the target neural network model may be trained by use of the target training data in the subsequent operation.

From the above, according to the method for processing image provided in the present disclosure, the image to be processed with the first resolution is acquired; and the target image is determined by use of the target neural network model according to the image to be processed. The target image is the denoised image with the second resolution, which is obtained by processing the image to be processed by the target neural network model. The second resolution is higher than the first resolution and the target neural network model includes the first preset number of convolutional layers and the second preset number of sub-pixel up-sampling portions. Therefore, processing of the image in the mobile terminal is implemented by use of the target neural network model. Moreover, both denoising and super-resolution functions are realized, performance of the image may further be improved, an image processing operation may be simplified, and a user experience may further be improved.

Figure 4:
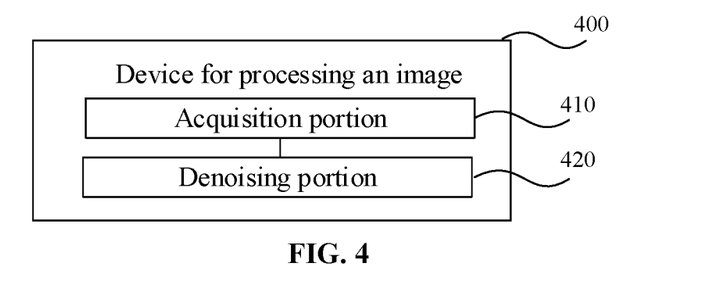
FIG. 4 is a block diagram of a device for processing an image, according to some embodiments of the present disclosure.

FIG. 4 is a block diagram of a device for processing an image, according to some embodiments of the present disclosure. Referring to FIG. 4, the device 400 is configured to implement the embodiment of the method, and includes:

an acquisition portion 410, configured to acquire an image to be processed with a first resolution; and a denoising portion 420, configured to process, by a target neural network model, the image to be processed to obtain a target image, the target image being a denoised image with a second resolution, the second resolution being higher than the first resolution, and the target neural network model including a first preset number of convolutional layers and a second preset number of sub-pixel up-sampling portions.

Figure 5:
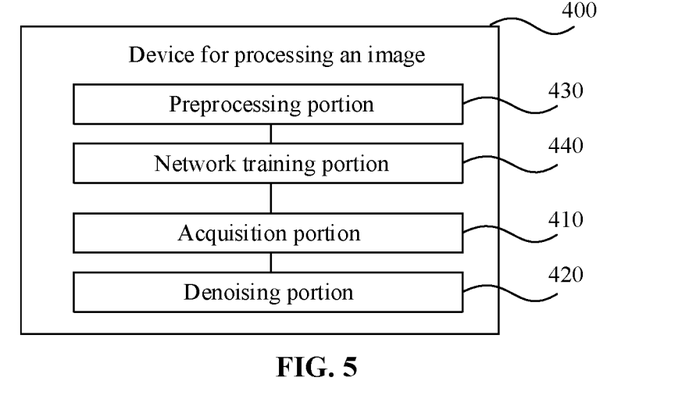
FIG. 5 is a block diagram of another device for processing an image, according to some embodiments of the present disclosure.

FIG. 5 is a block diagram of another device for processing an image, according to some embodiments of the present disclosure. Referring to FIG. 5, the device 400 further includes:

a preprocessing portion 430, configured to preprocess noise-free image data to acquire target training data; and a network training portion 440, configured to train an initial network model by use of the target training data via a stochastic gradient method to acquire the target neural network model.

Figure 6:
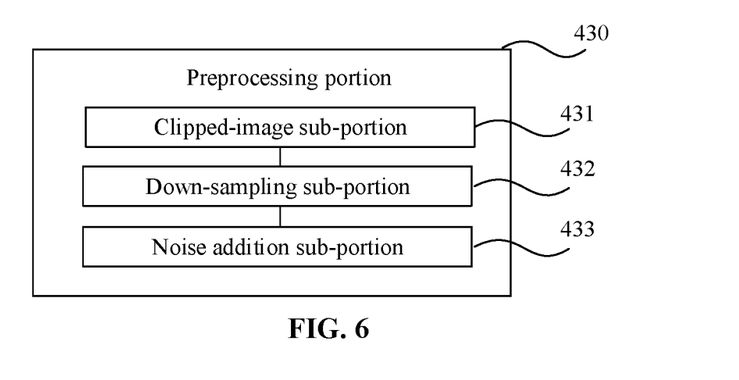
FIG. 6 is a block diagram of a preprocessing portion according to some embodiments of the present disclosure.

FIG. 6 is a block diagram of a preprocessing portion, according to some embodiments of the present disclosure. Referring to FIG. 6, the preprocessing portion 430 includes:

a clipped-image sub-portion 431, configured to clip the noise-free image data to determine first training data with a preset size;

a down-sampling sub-portion 432, configured to perform down-sampling processing by a preset multiple on the first training data to acquire second down-sampled training data; and a noise addition sub-portion 433, configured to add a preset compression noise into the second down-sampled training data to acquire the target training data.

In some embodiments, the network training portion 440 is configured to:

use the target training data with a preset batch size of each batch as input to train a parameter of the initial network model by use of a preset loss function via the stochastic gradient method, the loss function including a mean square error, a total variation and perceptual loss, and the mean square error including a red channel error, a green channel error and a blue channel error.

From the above, according to the device for processing image provided in the present disclosure, the image to be processed with the first resolution is acquired; and the target image is determined by use of the target neural network model according to the image to be processed. The target image is the denoised image with the second resolution, which is obtained by processing the image to be processed by the target neural network model. The second resolution is higher than the first resolution and the target neural network model includes the first preset number of convolutional layers and the second preset number of sub-pixel up-sampling portions. Therefore, processing of the image in the mobile terminal is implemented by use of the target neural network model. Moreover, both denoising and super-resolution functions are realized, performance of the image may further be improved, an image processing operation may be simplified, and a user experience is further improved.

With respect to the device in the above embodiment, the specific manners for performing operations for individual portions therein have been described in detail in the embodiments regarding the method, which will not be elaborated herein.

Various embodiments of the present disclosure also provides a non-transitory computer-readable storage medium having stored a computer program instruction that, when being executed by a processor, implements the operations of an image denoising processing method provided in the present disclosure.

Figure 7:
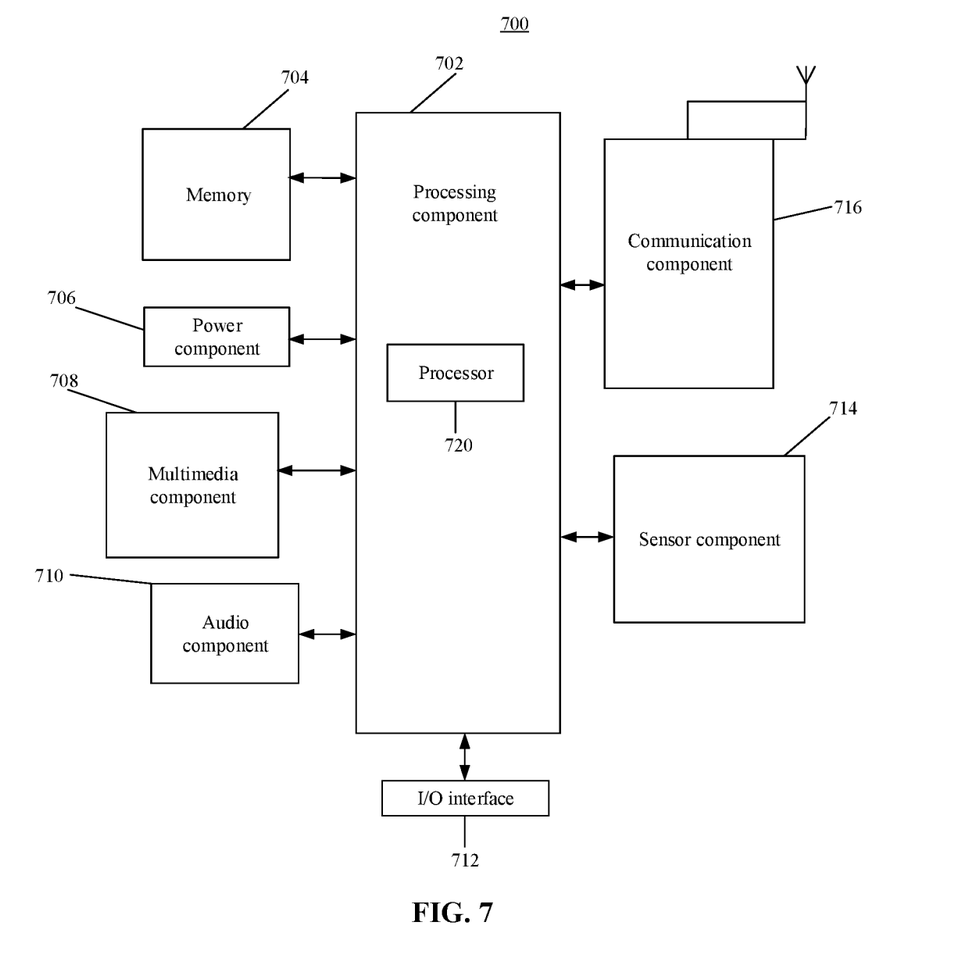
FIG. 7 is a block diagram of yet another device for processing an image, according to some embodiments of the present disclosure.

FIG. 7 is a block diagram of another device for processing an image, according to some embodiments of the present disclosure. For example, the device 700 may be a mobile phone, a computer, a digital broadcast terminal, a messaging device, a gaming console, a tablet, a medical device, exercise equipment, a personal digital assistant and the like.

Referring to FIG. 7, the device 700 may include one or more of the following components: a processing component 702, a memory 704, a power component 706, a multimedia component 708, an audio component 710, an Input/Output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the operations in the abovementioned method. Moreover, the processing component 702 may include one or more portions which facilitate interaction between the processing component 702 and the other components. For instance, the processing component 702 may include a multimedia portion to facilitate interaction between the multimedia component 708 and the processing component 702.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

The memory 704 is configured to store various types of data to support the operation of the device 700. Examples of such data include instructions for any application programs or methods operated on the device 700, contact data, phonebook data, messages, pictures, video, etc. The memory 704 may be implemented by any type of volatile or non-volatile memory devices, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 706 provides power for various components of the device 700. The power component 706 may include a power management system, one or more power supplies, and other components associated with generation, management and distribution of power for the device 700.

The multimedia component 708 includes a screen providing an output interface between the device 700 and a user. In some embodiments, the screen may include a Liquid Crystal Display (LCD) and a Touch Panel (TP). In some embodiments, organic light-emitting diode (OLED) or other types of displays can be employed.

If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 708 includes a front camera and/or a rear camera. The front camera and/or the rear camera may receive external multimedia data when the device 700 is in an operation mode, such as a photographing mode or a video mode. Each of the front camera and the rear camera may be a fixed optical lens system or have focusing and optical zooming capabilities.

The audio component 710 is configured to output and/or input an audio signal. For example, the audio component 710 includes a Microphone (MIC), and the MIC is configured to receive an external audio signal when the device 700 is in the operation mode, such as a call mode, a recording mode and a voice recognition mode. The received audio signal may further be stored in the memory 704 or sent through the communication component 716. In some embodiments, the audio component 710 further includes a speaker configured to output the audio signal.

The I/O interface 712 provides an interface between the processing component 702 and a peripheral interface portion, and the peripheral interface portion may be a keyboard, a click wheel, a button and the like. The buttons may include, but not limited to: a home button, a volume button, a starting button and a locking button.

The sensor component 714 includes one or more sensors configured to provide status assessment in various aspects for the device 700. For instance, the sensor component 714 may detect an on/off status of the device 700 and relative positioning of components, such as a display and small keyboard of the device 700, and the sensor component 714 may further detect a change in a position of the device 700 or a component of the device 700, presence or absence of contact between the user and the device 700, orientation or acceleration/deceleration of the device 700 and a change in temperature of the device 700. The sensor component 714 may include a proximity sensor configured to detect presence of an object nearby without any physical contact. The sensor component 714 may also include a light sensor, such as a Complementary Metal Oxide Semiconductor (CMOS) or Charge Coupled Device (CCD) image sensor, configured for use in an imaging APP. In some embodiments, the sensor component 714 may also include an acceleration sensor, a gyroscope sensor, a magnetic sensor, a pressure sensor or a temperature sensor.

The communication component 716 is configured to facilitate wired or wireless communication between the device 700 and other equipment. The device 700 may access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments of the present disclosure, the communication component 716 receives a broadcast signal or broadcast associated information from an external broadcast management system through a broadcast channel. In some embodiments of the present disclosure, the communication component 716 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the device 700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the image processing method.

In some embodiments of the present disclosure, there is also provided a non-transitory computer-readable storage medium including an instruction, such as the memory 704 including an instruction, and the instruction may be executed by the processor 720 of the device 700 to implement the image processing method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present disclosure is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for processing an image, applied to a mobile terminal, and comprising:

acquiring an image to be processed with a first resolution; and processing, by a target neural network model, the image to be processed to obtain a target image, the target image being a denoised image with a second resolution, the second resolution being higher than the first resolution, and the target neural network model comprising a first preset number of convolutional layers and a second preset number of sub-pixel up-sampling portions;

wherein the target neural network model is acquired by using target training data with a preset batch size of each batch as input, and training parameters of an initial network model by use of a preset loss function via a stochastic gradient method, the target training data is acquired by preprocessing noise-free image data;

the loss function is a weighted sum of a mean square error, a total variation and perceptual loss, and the mean square error is a weighted sum of a red channel error, a green channel error and a blue channel error.

2. The method of claim 1, wherein the preprocessing the noise-free image data to acquire the target training data comprises:
   clipping the noise-free image data to determine first training data with a preset size;
   performing down-sampling processing by a preset multiple on the first training data to acquire second down-sampled training data; and
   adding a preset compression noise into the second down-sampled training data to acquire the target training data.

3. The method of claim 2, wherein the preset compression noise is artificially generated compression noise with different levels.

4. The method of claim 1, wherein a weighted value corresponding to each part of the loss function corresponds to a practical application scenario.

5. The method of claim 1, wherein a weighted value corresponding to each part of the mean square error is regulatable.

6. The method of claim 1, wherein the target neural network model adopts characteristic extractions and operations of a low-dimensional space.

7. A device for processing an image, comprising:
   a processor; and
   a memory configured to store an instruction executable for the processor,
   wherein the processor is configured to:
   acquire an image to be processed with a first resolution; and
   process, by a target neural network model, the image to be processed to obtain a target image, the target image being a denoised image with a second resolution,
   the second resolution being higher than the first resolution, and the target neural network model comprising a first preset number of convolutional layers and a second preset number of sub-pixel up-sampling portions;
   wherein the target neural network model is acquired by using target training data with a preset batch size of each batch as input, and training parameters of an initial network model by use of a preset loss function via a stochastic gradient method, the target training data is acquired by preprocessing noise-free image data;
   the loss function is a weighted sum of a mean square error, a total variation and perceptual loss, and the mean square error is a weighted sum of a red channel error, a green channel error and a blue channel error.

8. The device of claim 7, wherein the processor is specifically configured to:
   clip the noise-free image data to determine first training data with a preset size;
   perform down-sampling processing by a preset multiple on the first training data to acquire second down-sampled training data; and
   add a preset compression noise into the second down-sampled training data to acquire the target training data.

9. The device of claim 8, wherein the preset compression noise is artificially generated compression noise with different levels.

10. The device of claim 7, wherein a weighted value corresponding to each part of the loss function corresponds to a practical application scenario.

11. The device of claim 7, wherein a weighted value corresponding to each part of the mean square error is regulatable.

12. The device of claim 7, wherein the target neural network model adopts characteristic extractions and operations of a low-dimensional space.

13. A non-transitory computer-readable storage medium having stored a computer program instruction that, when being executed by a processor, implements the operations of a method for processing an image, the method, applied to a mobile terminal and comprising:
   acquiring an image to be processed with a first resolution; and
   processing, by a target neural network model, the image to be processed to obtain a target image, the target image being a denoised image with a second resolution,
   the second resolution being higher than the first resolution, and the target neural network model comprising a first preset number of convolutional layers and a second preset number of sub-pixel up-sampling portions;
   wherein the target neural network model is acquired by using target training data with a preset batch size of each batch as input, and training parameters of an initial network model by use of a preset loss function via a stochastic gradient method, the target training data is acquired by preprocessing noise-free image data;
   the loss function is a weighted sum of a mean square error, a total variation and perceptual loss, and the mean square error is a weighted sum of a red channel error, a green channel error and a blue channel error.

14. The non-transitory computer-readable storage medium of claim 13, wherein the preprocessing the noise-free image data to acquire the target training data comprises:
   clipping the noise-free image data to determine first training data with a preset size;
   performing down-sampling processing by a preset multiple on the first training data to acquire second down-sampled training data; and
   adding a preset compression noise into the second down-sampled training data to acquire the target training data.

* * * * *